(No Model.)
W. INGALLS & F. A. BAILEY.
HAME FASTENER.
No. 352,542. Patented Nov. 16, 1886.
Fig. 1.
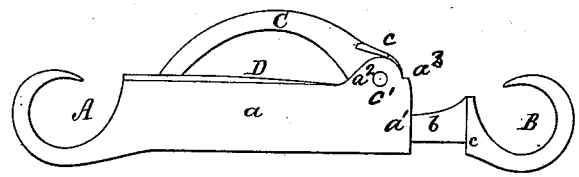
Fig. 2.
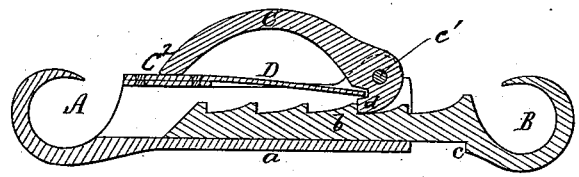
Fig. 3.
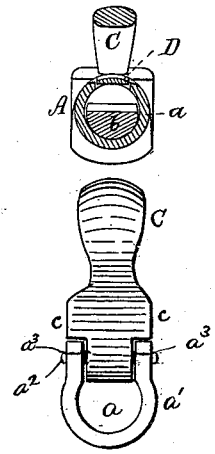
Fig. 4.
Witnesses.
S. N. Piper
H. B. Torrey
Inventors,
Wellington Ingalls.
Frederick A. Bailey.
by R. H. Eddy atty.

UNITED STATES PATENT OFFICE.

WELLINGTON INGALLS AND FREDERICK AUGUSTUS BAILEY, OF MATTA-WAMKEAG, MAINE.

HAME-FASTENER.

SPECIFICATION forming part of Letters Patent No. 352,542, dated November 16, 1886.

Application filed November 23, 1885. Serial No. 183,807. (No model.)

*To all whom it may concern:*

Be it known that we, WELLINGTON INGALLS and FREDERICK AUGUSTUS BAILEY, of Mattawamkeag, in the county of Penobscot, of the State of Maine, have invented a new and useful Improvement in Hame-Couplings; and we do hereby declare the same to be described in the following specification and represented in the accompanying drawings, of which—

Figure 1 is a side view, Fig. 2 a longitudinal section, and Fig. 3 a transverse section, of a hame-coupling of our invention, the nature of which is defined in the claim hereinafter presented. Fig. 4 is an end view of hook A.

Our invention has reference to the hame fastener or coupling described and represented in the United States Patent No. 81,650, on which it is an improvement, as, instead of having the catch-lever at its outer end borne by the spring against the toothed rack, such catch-lever at its outer end in our hame-coupling is borne against the shank $a$ or the spring, as hereinafter explained, in which case the spring is between the catch-lever and the teeth of the rack, and thus operates as a guard to prevent the fingers of a person, while hold of the lever, from being caught and injured by the rack-teeth on the tooth of the lever being drawn out of engagement with the rack. By having the catch-lever to bear at its end against the shank, accidental disengagement of the rack and catch-lever is prevented when the coupling is in use.

In the said drawings, A denotes a hook, whose shank $a$ is tubular, to receive within it the shank $b$ of another hook, B, such shank $b$ being a toothed rack extending from a shoulder, $c$, and being movable lengthwise within the bore of the shank $a$. Fulcrumed to the shank $a$, and extending laterally into its bore, is a catch-lever, C, formed as represented. This lever C is fulcrumed on the pin $c'$, and just above such pin it has two ears, $c$, projecting from its sides. At its end $a'$ the shank $a$ of hook A has in top the two lugs $a^2$, in which the lever C is fulcrumed. Beyond these lugs the shank extends or has on top the catches or notches $a^3$. There is affixed to the shank $a$ a spring, D, which at its free end bears on the catch-lever, so as to hold it in engagement with the rack. By raising the longer arm of the catch-lever, the shorter arm or catch $d$ of such lever will be moved out of engagement with the rack, it being in engagement therewith when the said longer arm is down, so that its outer end, $c^2$, rests on the shank $a$ or the spring affixed thereto.

When the coupling is in use, the two hooks are to be hooked into the lower eyes of a pair of hames and bent so as to couple therewith. After the hames may have been placed on a horse-collar in the usual manner, the shank of the hook B is to be inserted within that of the hook A until the hames may be drawn tightly upon the collar. In doing this the catch-lever will be raised to allow of the passage of the rack or toothed shank into the tubular shank, the spring subsequently moving the lever the opposite way and causing it to engage with the rack. To unfasten the hames the catch-lever is to be turned until its catch-arm is moved out of engagement with the rack, which having been done, the two hooks may be drawn asunder.

In operating this device the ears $c$ catch against the notches $a^3$, thus preventing the spring D being released by turning the lever C too far. Also, as strain is exerted on the fastening, the end $c^2$, bearing on the shank $a$, relieves the strain on the pin $c'$ and also limits the rotation of the catch, so that there is sufficient play for an easy releasement.

We claim—

The hame-fastening consisting in the combination of the hook A, having the tubular shank $a$, provided with notches $a^3$ at its end $a'$, the hook B, having the shank $b$, provided with a toothed rack, the catch-lever C, having the ends $d$ and $c^2$ and the ears $c$, located as described, the pin $c'$, and the spring D, the end $c^2$ bearing on the shank $a$ when the device is closed, and the ears $c$ catching on the notches $a^3$ when the device is open, as and for the purposes set forth.

WELLINGTON INGALLS.
FREDERICK AUGUSTUS BAILEY.

Witnesses:
CLARA S. FERNALD,
A. O. BAILEY.